May 24, 1966 C. BREEN ETAL 3,253,089

EQUIPMENT FOR OCCASIONAL TELEPHONE ANSWERING-SERVICE SYSTEMS

Filed Dec. 17, 1962 4 Sheets-Sheet 1

INVENTORS: C. BREEN
R. E. WATSON, JR.
S. B. WEINBERG

BY R. C. Winter

ATTORNEY

EQUIPMENT FOR OCCASIONAL TELEPHONE ANSWERING-SERVICE SYSTEMS

Filed Dec. 17, 1962 4 Sheets-Sheet 2

May 24, 1966 C. BREEN ET AL 3,253,089

EQUIPMENT FOR OCCASIONAL TELEPHONE ANSWERING-SERVICE SYSTEMS

Filed Dec. 17, 1962 4 Sheets-Sheet 3

EQUIPMENT FOR OCCASIONAL TELEPHONE ANSWERING-SERVICE SYSTEMS

Filed Dec. 17, 1962 4 Sheets-Sheet 4

United States Patent Office 3,253,089

Patented May 24, 1966

3,253,089

EQUIPMENT FOR OCCASIONAL TELEPHONE ANSWERING-SERVICE SYSTEMS

Charles Breen, Colts Neck, Robert E. Watson, Jr., Rumson, and Seymour B. Weinberg, Old Bridge, N.J., assignors to Bell Telephone Laboratories, Incorporated, New York, N.Y., a corporation of New York Filed Dec. 17, 1962, Ser. No. 244,991
19 Claims. (Cl. 179—27)

Figures 1, 5:
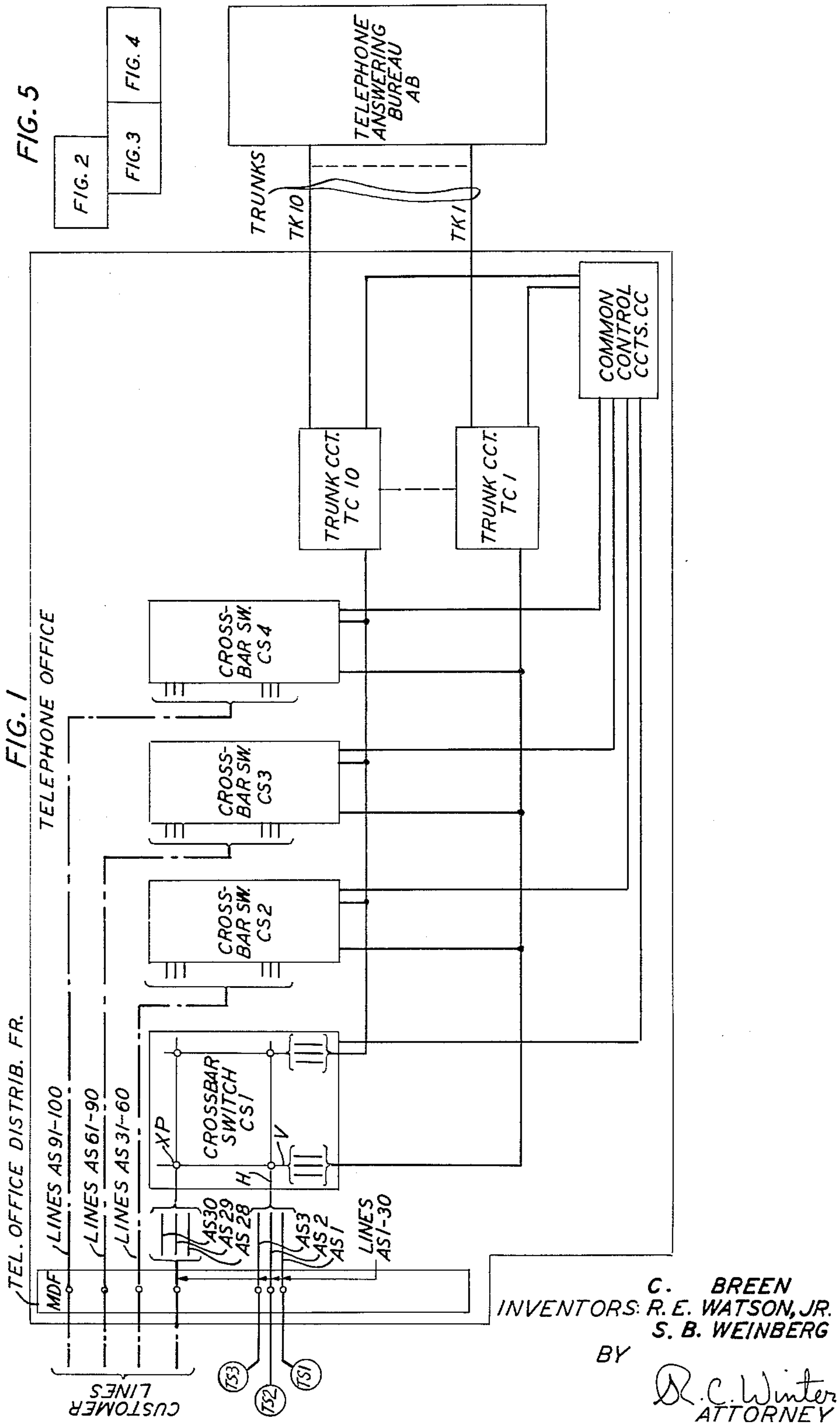

This invention relates to telephone systems and particularly to telephone answering-service systems in which customers desiring answering service on occasions when they are unavailable to answer their incoming calls may have such calls served by an operator at an answering bureau. Our invention further relates to switching equipment which enables trunks between an answering bureau and a telephone office to be assigned by an operator at the bureau to any one of a plurality of large groups of occasional answering-service customers on a part-time basis and, as a result, enables the trunks to be shared efficiently by the customers.

It is a well-known expedient to connect the individual trunk from a switchboard at an answering bureau to the telephone office appearance of a customer line for enabling an operator at the bureau to serve that customer's incoming calls when he is unavailable to do so. However, the economic burden of providing an individual trunk and the low usage of such a trunk by an occasional answering-service customer militates against its use for serving such a customer.

As a consequence, other systems have been developed for occasional answering-service customers to make the service economically more attractive and to use the answering-service trunks more efficiently. These systems are usually predicated on having a number of customers share a fewer number of trunks on a part-time basis.

One system wherein the trunks are shared on a part-time basis is disclosed in J. A. Burgener, United States Patent 1,922,879 issued August 15, 1933. In a system as disclosed in that patent, customer lines entitled to answering service are individually connected in the telephone office to bank terminals of a plurality of rotary stepping switches and the wipers of each of the switches are individually connected to a trunk circuit which is connected over a trunk to a switchboard at the answering bureau. After being notified by a customer that he will be unavailable to answer calls, the operator connects her telephone to an idle one of the trunks and dials a code into the associated trunk circuit for stepping the wipers of the associated rotary switch to the bank terminals connected to that customer's line. The trunk circuit thereafter detects all incoming calls for the customer and connects them to the answering bureau whereat they are served by the operator.

Although such a system makes possible a reduction in trunk expense, optimum economy is not realizable when it is used for serving occasional answering-service customers because the trunks are yet inefficiently used. This inefficiency is due in part to the inherent limitations of the switching equipment, such as the rotary switch, and the small group of customers which it makes each trunk capable of serving, as well as the very low usage of each trunk by the small group of customers. Accordingly, new structural facilities are required to achieve still more economical and efficient use of trunks employed for occasional answering service.

In view of the foregoing, it is an object of our invention to provide an improved switching system for serving occasional answering-service customers.

Another object is to provide new and economical switching equipment which makes it possible to use efficiently the trunks serving occasional answering-service customers.

These and other objects are attained in accordance with an exemplary embodiment of our invention wherein simple and inexpensive switching equipment is provided in a telephone office for enabling each trunk between the office and an answering bureau to serve a plurality of different large groups of occasional answering-service customers on a part-time basis. This equipment includes common control circuits for controlling a plurality of crossbar switches to interconnect any one of one hundred customers lines with any one of ten trunk circuits associated with ten trunks to the answering bureau.

Each customer entitled to answering service has his line appearance in the office connected individually to a horizontal of a crossbar switch. A horizontal comprises six conductors and provides for the termination of three two-wire customer lines. Thus, each crossbar switch having ten horizontals may terminate a group of thirty customer lines. The corresponding vertical conductors of each of the crossbar switches are multipled together and each vertical is connected individually to a trunk circuit associated with a trunk to the answering bureau. These crossbar switches and trunk circuits are controlled by common control circuits for effecting the connection of any selected line to a trunk and the subsequent release of the established connections.

After being notified that a participating customers will be unavailable to answer calls, the operator at the answering bureau connects her telephone to an idle one of the trunks and dials into the associated trunk circuit a code which has been assigned to that customer. The trunk circuit then sends the received code to the common control circuits which activate the appropriate crossbar switch to connect three customer lines to the trunk circuit. The control circuit also operates apparatus in the trunk circuit for selecting the desired one of the three lines for answering service. Subsequently, when an incoming call is received on the selected customer line, the trunk circuit detects the ringing signal and routes the call to the answering bureau where it is served by an operator.

Thereafter, when the customer informs the operator that he is again available to answer his incoming calls, the operator reconnects her telephone to the trunk and dials another code into the trunk circuit which sends it to the common control circuits for effecting the release of the trunk circuit and crossbar switch associated with that customer's line to interrupt the telephone answering service.

An advantage of our invention is the trunk assignment flexibility obtained with our switching equipment. This flexibility permits any trunk to be assigned to serve a request for answering service received from any customer in any one of a plurality of different customer groups. As a consequence, a balanced traffic load is produced by the groups of customers and more efficient use is made of the trunks.

A feature of our invention is that switching equipment in the telephone office is activated in response to signals received from a telephone answering-service bureau for connecting a designated group of customer lines to any selected one of a plurality of trunk circuits, and the selected circuit includes apparatus controlled from the bureau for extending incoming calls on one of the connected lines via a trunk to the bureau for service.

Another feature is that a group of customer lines is connected to each set of horizontal conductors of a crossbar switch and a trunk circuit is connected to each set of the vertical conductors of the switch, that a control circuit is activated by signals received from an answering-service bureau to operate the switch to connect any designated group of lines to any selected one of the trunk circuits, and that the selected circuit includes apparatus activated by the control circuit for conditioning any one of the designated group of lines for receiving answering service via an associated trunk to the answering bureau.

A further feature is the provision of telephone answering-service equipment including a plurality of crossbar switches each having groups of horizontal and vertical conductors, each of the groups of horizontal conductors connectable individually to a telephone customer line, each group of vertical conductors of each switch being multiple connected to a group of vertical conductors on each of the other switches, a plurality of trunk circuits each connected to a group of the vertical conductors and to a trunk to a telephone answering-service bureau, and common control circuits responsive to signals received from the answering bureau for activating the switches to connect any one of the lines via any one of the trunk circuits and its associated trunk to the answering bureau for service.

Another feature is the provision of a telephone answering-service system having a plurality of crossbar switches each having sets of horizontal and vertical conductors, a group of telephone customer lines connected to each set of the horizontal conductors, each of the corresponding sets of vertical conductors on each of the switches being multipled together, a plurality of trunk circuits each individually connected to a set of the vertical conductors and a trunk to a telephone answering-service bureau, crossbar switch control facilities including a select magnet per switch corresponding to each set of the horizontal conductors and a hold magnet per switch corresponding to each set of the vertical conductors, common control circuits responsive to dial pulses received from the bureau via any one of the trunk circuits for activating one of the select magnets to select a group of the customer lines for connection to that tunk circuit, and the latter circuit comprising apparatus cooperating with the activated select magnet to operate one of the hold magnets for interconnecting the trunk circuit and the selected group of lines and line selecting apparatus activated by the common control circuits for selecting one of the lines in the selected group for answering service over the associated trunk.

A further feature is that the common control circuits include a stepping selector switch having a terminal bank comprising a group of terminals corresponding to each one of the crossbar switch select magnets, a stepping circuit responsive to the received dial pulses for causing the stepping of a wiper from terminal to terminal of the bank, and apparatus responsive after the receipt of all of the pulses for applying a control signal through the wiper and a terminal of the bank to activate one of the select magnets.

A further feature is that the stepping selector switch further comprises a second terminal bank having a group of terminals for each of the customer lines in a group, a wiper stepped by the stepping circuit from terminal to terminal of the second bank, and facilities for applying a control signal through the wiper and a terminal of the second bank for controlling the line selecting apparatus in a trunk circuit to condition the selected line for answering service.

Another feature is the provision in each trunk circuit of apparatus connected to the associated trunk and responsive to pulses received from the answering bureau for repeating the pulses to the selector switch stepping circuit, and apparatus controlled by an activated select magnet and the repeating apparatus for operating a hold magnet to connect a selected group of customer lines to the trunk circuit.

Still another feature is the provision in each trunk circuit of a circuit for detecting incoming calls, and a device in its line selecting apparatus activated by the stepping selector switch for connecting the detecting circuit to a selected customer line.

A further feature is that each trunk circuit comprises a transfer relay activated by an operated hold magnet for disconnecting the repeating apparatus from the associated trunk and preparing the trunk for connection to the selected line, and a relay activated by the call detecting circuit for interconnecting a selected line and the associated trunk to complete call connections to the answering bureau.

Yet another feature of our invention is that each of the sets of horizontal and vertical conductors of each crossbar switch includes subsets each having a pair of conductors, that each line in a customer line group comprises a pair of conductors individually connected to a subset pair of the horizontal conductors, and that the line selecting circuit in each trunk circuit comprises a relay individually connected to each of the groups of terminals on the second terminal bank of the selector switch and that relay is operated when a control signal is applied to the last-mentioned terminals for selecting one of lines of the group for connection to the call detecting circuit.

It is a feature of our invention that the call detecting circuit includes a relay arrangement for detecting ringing signals applied to the selected line upon the receipt of a call, and the interconnecting means comprises a relay activated by the ring detecting relay for interconnecting the selected line and the transfer relay to extend the received ringing signals over the associated trunk to the answering bureau.

A further feature is that the common control circuits further comprise a release circuit including a stepping switch activated by release pulses received from the answering bureau for controlling the crossbar switch control means to effect the release of connections between any selected group of lines and any trunk circuit.

Figure 2:
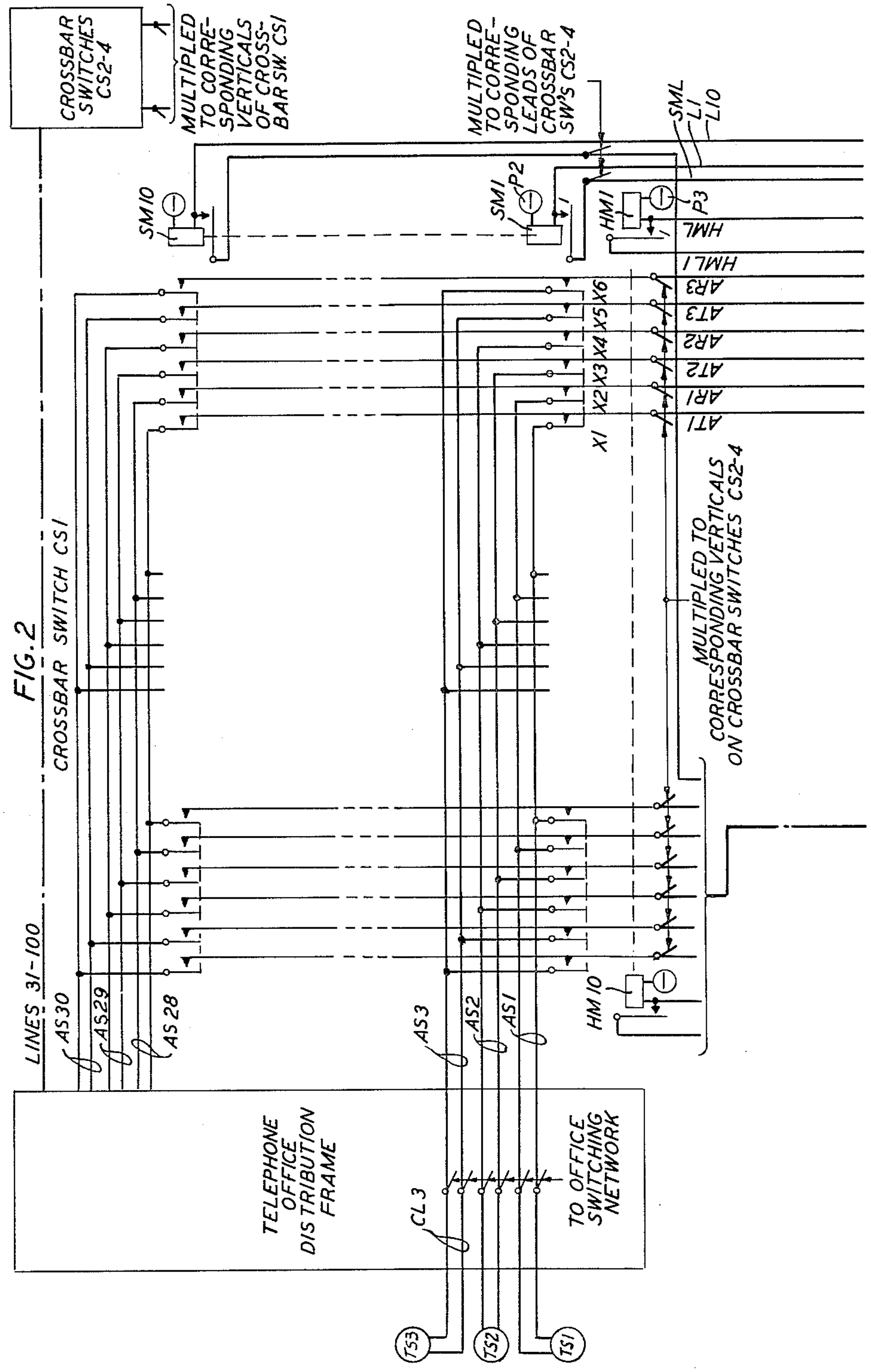
Figure 3:
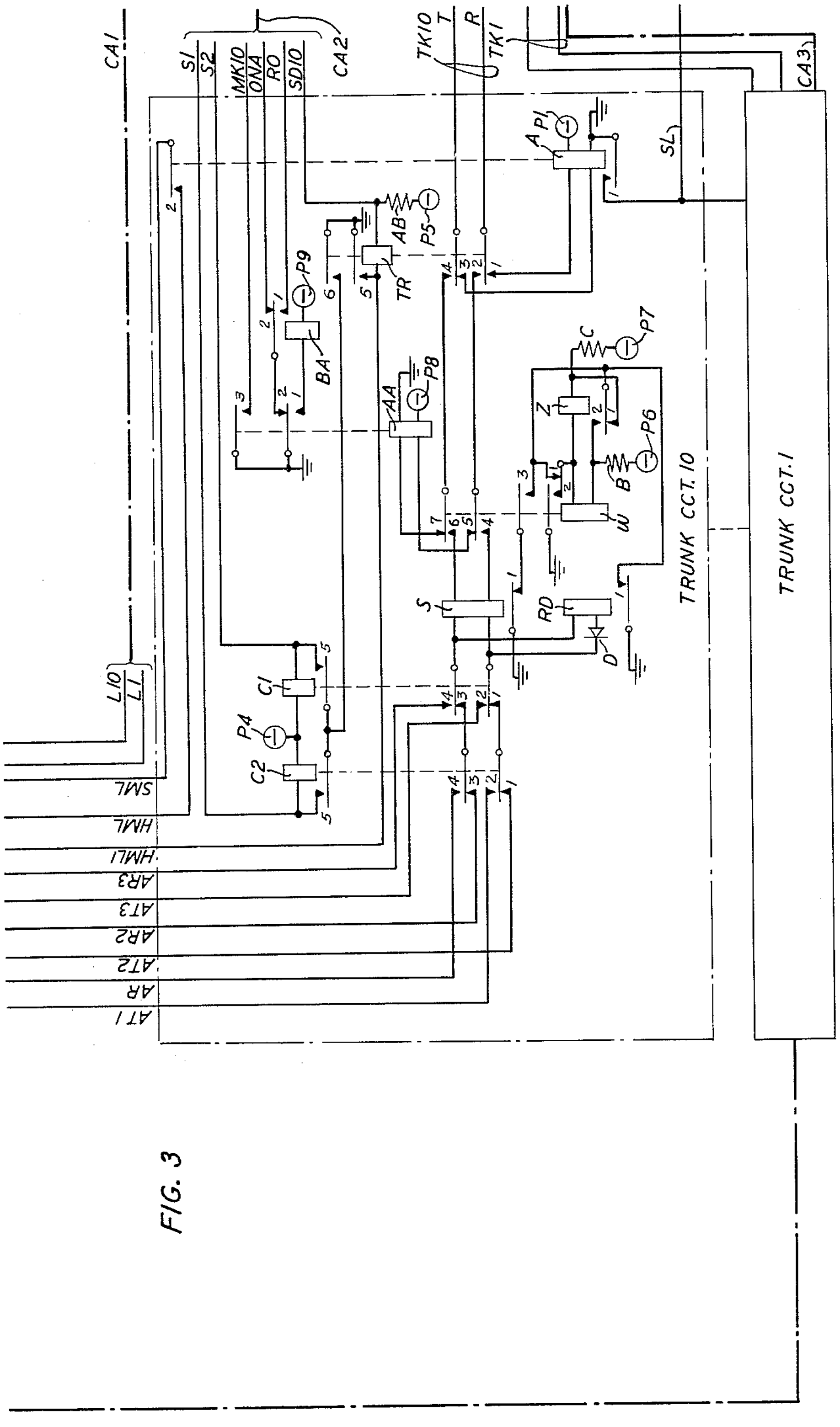
Figure 4:
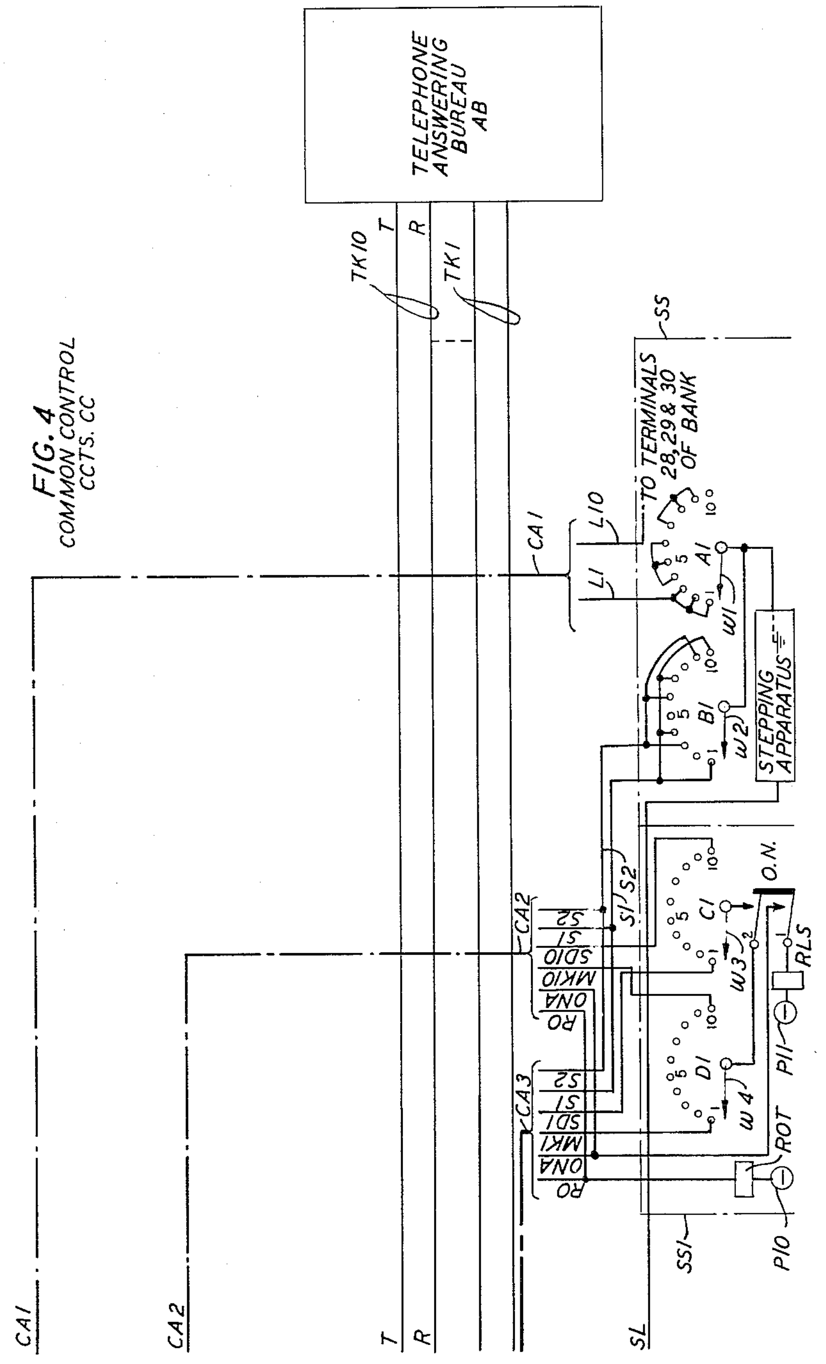

The foregoing and other objects, advantages and features of our invention will be more clearly understood by a reading of the following description of an exemplary embodiment thereof shown in the drawing in which:

FIG. 1 shows, in block diagram form, the interrelation of the equipment units of the exemplary embodiment;

FIGS. 2, 3 and 4 show in greater detail some of the equipment units including a crossbar switch for connecting thirty customer lines to any one of ten trunk circuits under control of common control circuits, and ten trunks interconnecting the trunk circuits and a telephone answering bureau; and FIG. 5 depicts the position in which FIGS. 2, 3 and 4 should be placed to show the cooperation between the equipment units.

The general organization of the principal equipment units of the system will now be described with reference to FIG. 1. Each of the customer lines entitled to telephone answering service is connected in the telephone office through the main distribution frame MDF over one of the short answering service lines AS1–100 to one of the crossbar switches CS1–4. The crossbar switch may be of the type disclosed in FIG. 9–21 and described on pages 195–199 of the book, "The Design of Switching Circuits," by Keister, Ritchie and Washburn and published by D. Van Nostrand Inc. in 1956. Such a switch may comprise ten horizontal units and ten vertical units and have one hundred crosspoints.

All lines AS1–100 terminate on the horizontals of the crossbar switches. A group of three of the latter lines, such as lines AS1–3, are terminated individually on each horizontal unit, such as horizontal H, of a crossbar switch. Accordingly, thirty of the answering lines terminate individually on each of the switches CS1–3, and the remaining ten lines terminate on switch CS4. Each of the verticals, such as vertical V, of a crossbar switch is multiple connected to all of the corresponding verticals of the other crossbar switches and to one of the trunk circuits TC1-10. The crossbar switch horizontals and verticals further are arranged to provide a link through a crosspoint, such as crosspoint XP, between each answering service line and each of the trunk circuits TC1–10. The latter circuits are also connected over the trunks TK1–10 to a switchboard (not shown) at the telephone answering bureau AB.

When a customer entitled to answering service plans to be unavailable to answer incoming calls, he calls an operator at the bureau AB over conventional telephone facilities and requests the answering service. The operator then connects her telephone (not shown) via the switchboard (not shown) to an idle one of the trunks TK1–10 for activating the associated one of the trunk circuits TC1–10. She proceeds then to dial into the activated trunk circuit a code assigned to the customer requesting the service. This code is used by the trunk circuit for activating the common control circuit CC which together with apparatus in the trunk circuit operates the appropriate crossbar switch to interconnect the trunk circuit and the group of answering service lines in which is included the answering service line connected to the requesting customer's line. Circuit CC also is operated in response to the received code for conditioning the activated trunk circuit for connecting incoming calls to the requesting customer line over the associated trunk to the answering bureau where they are served by an operator. After circuit CC has completed these functions, it is released and made available for connecting any of the other answering service lines to any other of the trunk circuits.

At the time that a customer again is available to answer his incoming calls, the operator at bureau AB terminates the answering service. To do so, the operator reconnects her telephone (not shown) to the trunk serving that customer and proceeds to dial into the associated trunk circuit a digit corresponding to the number of the trunk. This digit is sent to the common control circuits CC for causing the release of the trunk circuit and the crossbar switch associated with the requesting customer line and thereby terminating the answering service.

The detailed circuit operations involved in preparing the answering bureau and the equipment at the telephone office for answering calls on customer lines will now be described by reference to FIGS. 2, 3 and 4. For the purpose of simplifying the understanding of these operations, the description will be presented by assuming that answering service is to be provided for the customer at telephone station TS3 via crossbar switch CS1 of FIG. 2, trunk circuit TC10 of FIG. 3, and trunk TK10 of FIG. 4. The latter trunk is selected for the answering service when the operator connects her telephone (not shown) via the switchboard (not shown) to the tip and ring leads T and R. This closes the circuit for operating relay A in trunk circuit TC10. The latter operating circuit extends from ground through the lower winding of relay A, contact 3 of the transfer relay TR, lead T, operator telephone, lead R, contact 1 of relay TR, and the upper winding of relay A to the negative potential P1.

Upon operating, relay A closes its contact 1 to apply ground to lead SL and thereby prepare the stepping apparatus of the conventional step-by-step switch SS for receiving dial pulses and stepping the wipers W1 and W2 from terminal to terminal of its associated banks. Switch SS has two banks consisting of ten rows or levels A1–10 and B1–10 and each level has ten terminals. For simplicity, only the first levels A1 and B1 of each bank is depicted in FIG. 4 and the levels A2–10 and B2–10 are not shown. Each level of each bank is placed one above the other to compose a one hundred position unit. Successive terminals of the level A1 and the other levels A2–10 (not shown) are multipled together in groups of three and are connected individually to a select magnet of one of the crossbar switches CS1–4. Illustrative of this arrangement is the strapping on terminals 1, 2 and 3 of level A1 and the connection of these terminals via lead L1 of cable CA1 to the select magnet SM1 of crossbar switch CS1. Similarly, the twenty-eight, twenty-ninth and thirtieth terminals (not shown) of the bank (terminals 8, 9 and 10 of level A3) are strapped together and connected via lead L10 of cable CA1 to the select magnet SM10 of switch CS1.

The first and every third succeeding terminal of level B1 and the succeeding levels B2–10 (not shown) are multiplied together and are connected via the led S1 to each of the trunk circuits TC1–10. Illustrative of this wiring pattern is the strapping together of terminals 1, 4, 7 and 10 of level B1 and terminals 3, 6 and 9 (not shown) of the next succeeding level B2 (not shown). In a like pattern, the third and every successive third terminal of level B1 and the succeeding levels B2–10 (not shown) are multipled together and are connected via the lead S2 to each of the trunk circuits TC1–10. Exemplary of the latter pattern is the strapping together of terminals 3, 6 and 9 of level B1 and terminals 2, 5 and 8 (not shown) of the next succeeding level B2 (not shown). As will be hereinafter described, these wiring patterns permit the selection of the appropriate one of the three customer lines that will be connected to the activated trunk circuit TC10 for answering service.

Shortly after the operator has connected her telephone to the trunk TK10, she proceeds to dial the two-digit code 13 assigned to the customer at station TS3. As is well known, the dialing operation causes the periodic opening and reclosure of the D.-C. circuit through relay A in accordance with the dialed digit and causes that relay to periodically release and reoperate. The circuit action of relay A thus repeats each dialed digit through its contact 1 over lead SL to the stepping apparatus of switch SS. Accordingly, when the operator dials the first digit 1, it causes the stepping apparatus to step the wipers W1 and W2 vertically to a position adjacent to the levels A1 and B1, respectively. The second digit 3 received by the stepping apparatus causes wipers W1 and W2 to step horizontally across terminals 1 and 2 onto terminals 3 of the levels A1 and B1, respectively.

At the end of the dialing operations, relay A is reoperated and the stepping apparatus applies ground to the wipers W1 and W2. The ground on wiper W1 completes the operate circuit for the select magnet SM1 of FIG. 2 to select the group of three lines AS1–3 for connection to circuit TC10. This operate circuit is from ground on wiper W1 through terminal 3 of level A1, lead L1 of cable CA1 and the winding of magnet SM1 to the negative potential P2. Upon operating, magnet SM1 closes its off-normal contact 1 for extending the ground on lead L1 over lead SML through contact 2 of relay A, lead HML, and the winding of the hold magnet HM1 to energize magnet HM1 and thereby close the crosspoint contacts X1–6 to connect lines AS1–3 over the leads AT1–3 and AR1–3 to circuit TC10.

Line AS3 is selected from the other lines AS1 and AS2 for answering service by extending the ground from wiper W2 through terminal 3 of level B1, lead S2 of cable CA2, and the winding of relay C1 of FIG. 3 to the negative potential P4 to operate relay C1. Operated relay C1 closes its contacts 2 and 4 to connect the leads AT3 and AR3 to the windings of the ring-detector relay RD via the diode D and thereby conditions circuit TC10 for only responding to incoming calls directed to station TS3.

At this point, it is advisable to note that line AS1 can be selected instead of line AS3 when the operator dials the code 11 instead of the code 13. In such a case, the wipers W1 and W2 are advanced to terminals 1 on the levels A1 and B1 and ground is subsequently applied to wipers W1 and W2 as previously explained. Ground on wiper W1 causes the same operation of the magnets SM1 and HM1 as hereinbefore described. The ground on wiper W2, however, is extending through terminal 1 of level B1, lead S1 of cable CA2 and the winding of relay C2 of FIG. 3 to potential P4 for operating relay C2. upon operating, relay C2 closes its contacts 2 and 4 to connect leads AT1 and AR1 through contacts 1 and 3 of relay C1 and diode D to the winding of relay RD and thereby condition circuit TC10 for only responding to incoming calls directed to the telephone station TS1.

In a similar fashion, line AS2 can be selected instead of either line AS1 or AS3 when the operator dials the code 12. When the latter code is dialed, the wipers W1 and W2 are stepped to terminals 2 on the levels A1 and B1 and ground is applied to wiper W1 to cause the operation of the magnets SM1 and HM1 as previously described to interconnect lines AS1–3 to circuit TC10. Wiper W2 is also grounded but it performs no function at this time. As a consequence, relays C1 and C2 in circuit TC10 remain released and leads AT2 and AR2 are extended through contacts 1 and 3 of relays C1 and C2 and diode D to the winding of relay RD to condition circuit TC10 for only responding to incoming calls directed to the telephone station TS2.

When the hold magnet HM1 is energized, as previously described, it activates its off-normal contact 1 to apply the ground on lead HML over lead HML1 to complete the circuit through the winding of the transfer relay TR and resistor AB to the negative potential P5 for operating relay TR. Upon operating, relay TR closes its contact 5 to complete a locking path for itself and magnet HM1. Operated relay TR closes at its contact 6 a locking path for relay C1. Relay TR also actuates its contacts 1–4 to transfer leads T and R from the windings of relay A to the winding of relay AA via contacts 5 and 7 of the connector relay W of FIG. 3 and thereby to release relay A and operates relay AA. The operation of relay AA at this time performs no useful function. It is activated, as hereinafter described, for releasing the answering equipment associated with lines AS1–3 when answering service over these lines is terminated.

Released relay A opens its contact 2 to release the select magnet SM1 and also remove ground from lead SL for releasing the stepping apparatus and thereby remove the ground from wipers W1 and W2 and restore the wipers W1 and W2 to the idle position as shown in the drawing. The equipment of FIG. 2, 3 and 4 is now prepared to connect incoming calls for station TS3 to the answering bureau AB.

After switch SS has been returned to the idle condition, it may then be utilized by an operator at bureau AB for selecting and controlling the connection of one of the customer lines 1, 2 or 4–100 through one of the crossbar switches CS1–4 to an idle one of the trunk circuits TC1–9 (TC2–9 not shown) and thereby conditioning the answering equipment to connect incoming calls for that line to the answering bureau. The manner in which these functions are performed is essentially the same as described previously with respect to the preparation of line AS3 for providing answering service to station TS3.

When a call is made through the telephone office switching network to the telephone station TS3, ringing current is applied over line AS3 through crosspoint contacts X5 and X6, leads AT3 and AR3, contacts 3 and 4 of relay C1 and diode D to the windings of relay RD to operate relay RD. The latter relay closes its contact 1 to apply ground through the contact 1 and winding of relay W and resistor B to the negative potential P6 to operate relay W which then closes a locking path for itself through its contact 2. Relay W also closes its contacts 4 and 6 to interconnect leads T and R from the bureau AB with the customer line CL3 via contacts 2 and 4 of relay TR, the noninductive windings of the supervisory relay S, contacts 2 and 4 of relay C1, leads AT3 and AR3, crosspoint contacts X5 and X6 and line AS3. Ringing current is now sent over the last-described path to bureau AB for activating apparatus (not shown) which notifies the operator of the incoming call. The operator then connects her telephone (not shown) to leads T and R for answering the call. The connection of the operator telephone to leads T and R trips the ringing current to effect the release of relay RD and completes an operate circuit for relay S to potentials (not shown) which are applied in the conventional manner to the customer line CL3 by equipment (not shown) in the telephone office during the call.

Operated relay S opens its contact 1 to remove the ground applied through contact 3 of relay W and contact 1 of relay Z to shunt relay Z and thereby permits relay Z to operate over the circuit extending from ground through contact 2 of relay W, the winding of relay Z, and the resistor C to the negative potential P7. The operator may now talk with the called party and furnish to the caller that informaion which was previously supplied by he called customer, as well as, recording any messages given by the caller.

At the end of the call, the operator will disconnect her telephone from leads T and R and thereby cause a release of relay S. Upon releasing, relay S recloses its contact 1 to apply ground through contact 3 of relay W, and contact 2 of relay Z to resistor B to shunt down relay W and to effect its release. Released relay W recloses its contacts 4 and 6 to transfer leads T and R back to the windings of relay AA and reopens its contact 2 to cause the release of relay Z. Circuit TC10 is thus returned to the condition at which it rested prior to the receipt of the call and is ready to serve another incoming call from station TS3.

When the customer station TS3 desires to have his line removed from the answering service, the operator again will connect her telephone (not shown) to trunk TK10. As a result, relay AA will operate over the circuit extending ground through the upper winding of relay AA, contact 7 of relay W, contact 4 of relay TR, lead T, operator telephone (not shown), lead R, contact 2 of relay TR, contact 5 of relay W and the lower winding of relay AA to the negative potential P8. Operated relay AA closes ground through its contact 1 and the winding of relay BA to the negative potenial P9 to operate relay BA.

The operator then dials the digit zero corresponding to the number of the trunk TK10 and accordingly relay AA will release and reoperate ten times thereby to repeat the dialed digit through its contact 2. Relay BA is a slow release in order that it may remain operated the train of dial pulses. Each time relay AA releases, ground is applied through its contact 2, contact 1 of relay BA over lead RO and the winding of the rotary magnet ROT of the rotary stepping switch SS1 to the negative potential P10 to energize magnet ROT for causing it to step the wipers W3 and W4 from terminal to terminal on the associated banks C1 and D1. As a result of the dialed digit zero, wipers W3 and W4 are stepped to terminals 10 of the banks C1 and D1, respectively.

At the end of the dialing, relay AA is operated over the previously-traced path and a marking ground potential is applied through contact 3 of relay AA, lead MK10, terminal 10 of bank D1, wiper W4, actuated O.N. contact 2, wiper W3, terminal 10 of bank C1 and lead SD10 to shunt down the winding of relay TR to cause relay TR to release. Released relay TR opens at its contact 5 the locking path for itself and holding magnet HM1. Magnet HM1 de-energizes to open the crosspoint contacts X1–6 and thereby disconnect lines AS1–3 from circuit TC10. Upon releasing, relay TR also opens its contacts 6 to release relay C1. At the same time, relay TR actuates its contacts 1–4 to transfer leads T and R and the windings of relay AA to the windings of relay A. Consequently, relay AA releases and opens its contact 1 to release relay BA. Released relay AA also applies ground through its contact 2, contact 2 of relay BA, lead ONA, actuated O.N. contact 1 and the winding of the release magnet RLS to he negative potential P11 for energizing magnet RLS and thereby restoring the wipers W3 and W4 to the normal position as shown in the drawing. When the wipers return to their normal position, O.N. contacts 1 and 2 are reopened to de-energize magnet RLS for restoring switch SS1 to the idle position. Circuit TC10 is now ready to be reconnected to another customer line entitled to answer service.

It is to be understood that the above-described arrangements are illustrative of the application of the principles of our invention. Numerous other arragements may be devised by those skilled in the art without departing from the spirit and scope of our invention.

What is claimed is:

1. In combination, groups of telephone customer lines, a plurality of trunk circuits each having an associated trunk to a telephone answering-service bureau, switching means activated in response to signals received from said bureau for connecting any designated group of said lines to any one of said circuits, and means in each of said circuits controlled from said bureau for extending calls on any one of said connected lines to said bureau via the associated trunk.

2. In combination, a plurality of telephone customer lines, a plurality of trunk circuits each having an associated trunk to a telephone answering-service bureau, a crossbar switch operable in response to signals received from said bureau for selectively connecting each of said circuits to any one of said lines, and means in each of said circuits controlled from said bureau for extending calls on the connected line via the associated trunk to said bureau for service.

3. Switching equipment for a telephone answering-service system comprising a crossbar switch having sets of horizontal and vertical conductors, each of said sets of horizontal conductors connected to a group of telephone customer lines, a plurality of trunk circuits each individually connected to a set of said vertical conductors and including a trunk to a telephone answering-service bureau, control means responsive to designating signals received from said bureau for activating said switch to interconnect any designated group of lines with any one of said circuits, and means in said one circuit activated by said control means for conditioning any one of the designated group of lines for receiving answering service via the associated trunk from said bureau.

4. Switching equipment for a telephone answering-service system comprising a plurality of crossbar switches each having groups of vertical and horizontal conductors, each group of vertical conductors of each of said switches connected to a group of vertical conductors on each of the other of said switches, a plurality of trunk facilities each individually connected to a group of said vertical conductors and to a telephone answering-service bureau, a plurality of telephone lines each individually connected to a group of said horizontal conductors, and control means responsive to signals from said bureau for activating said switches to interconnect any one of said lines and said bureau via any one of said facilities.

5. Telephone answering-service equipment comprising a plurality of crossbar switches each having sets of vertical and horizontal conductors, each of the corresponding sets of vertical conductors of each of said switches being multiplied together, a plurality of trunk circuits each individually connected to a set of said vertical conductors and including a trunk extending to a telephone answering-service bureau, groups of telephone lines, each group of said lines individually connected to a set of said horizontal conductors, switch control means including a select magnet per switch corresponding to each set of said horizontal conductors and a hold magnet per switch corresponding to each set of said vertical conductors, and common control means responsive to designating signals received from said bureau via any one of said circuits for controlling said magnets to effect the interconnection of said one circuit and any designated group of said lines and selectively conditioning said last-mentioned lines for receiving answering service from said bureau via the associated trunk.

6. Telephone answering-service equipment in accordance with claim 5 wherein said common control means comprises selection means responsive to designating signals received from said bureau via said one trunk for activating a designated one of said select magnets, and said one trunk circuit comprises means cooperating with the activated select magnet for operating a hold magnet to effect the interconnection of said one circcuit and the designated group of said lines.

7. Telephone answering-service equipment in accordance with claim 6 wherein said one trunk circuit comprises means activated by said selection means to select a line in said designated group of lines for receiving answering service from said bureau via the associated trunk.

8. A telephone answering-service system comprising plurality of crossbar switches each having sets of horizontal and vertical conductors, a group of telephone lines individually connected to each set of said horizontal conductors, each of said corresponding sets of vertical conductors on each of said switches multiplied together, a plurality of trunk circuits each individually connected to a set of said vertical conductors, a telephone answering-service bureau, a plurality of trunks each individually connecting one of said circuits to said bureau, crossbar switch control means including a select magnet per switch corresponding to each set of said horizontal conductors and a hold magnet per switch corresponding to each set of said vertical conductors, common control means responsive to electrical pulses received from said bureau via any one of said circuits for activating one of said select magnets to select a group of said lines for connection to said one circuit, means in said one circuit cooperating with the activated select magnet to operate one of said hold magnets for connecting the selected group of lines to said one circuit, and line selecting means in said one circuit activated by said control means for selecting one line in said selected group of lines for answering service.

9. A telephone answering-service system in accordance with claim 8 wherein said common control means comprises a stepping selector switch having a terminal bank including a group of terminals corresponding to each one of said select magnets, a wiper for cooperating with said bank, stepping apparatus responsive to said pulses for causing the stepping of said wiper from terminal to terminal of said bank, and means responsive after the receipt of said pulses for applying an electrical signal through said wiper and one of said terminals to activate said one select magnet.

10. A telephone answering-service system in accordance with claim 9 wherein said stepping selector switch further comprises a second terminal bank having a group of terminals for each of said lines, a wiper stepped by said stepping apparatus from terminal to terminal on said second bank, and means for applying said electrical signal through said last-mentioned wiper and a terminal of said second bank for controlling the selecting means in said one trunk circuit to condition said selected line for answering service.

11. A telephone answering-service system in accordance with claim 10 wherein said one trunk circuit further comprises means connected to the associated trunk and responsive to said pulses received from said bureau for repeating said pulses to said stepping apparatus, and means controlled by said activated select magnet and said repeating means for operating a hold magnet to connect said selected group of lines to said one circuit.

12. A telephone answering-service system in accordance with claim 11 wherein said one trunk circuit further comprises means for detecting incoming calls, and said line selecting means being activated by said selector switch for connecting said detecting means to said selected line.

13. A telephone answering-service system in accordance with claim 12 wherein said one trunk circuit further comprises transfer means activated by said operated hold magnet for disconnecting said repeating means from said associated trunk for connection to said selected line, and interconnecting means activated by said dectecting means upon the receipt of a call for interconnecting said selected line and said associated trunk to complete call connections to said bureau.

14. A telephone answering-service system in accordance with claim 13 wherein each of said sets of horizontal and vertical conductors includes subsets each having a pair of conductors, each line in said groups comprises a pair of conductors connected individually to a subset pair of said horizontal conductors, and said line selecting means in said one trunk circuit comprises a relay individually connected to each of said group of terminals of said second bank and operable when said electrical signal is applied to said last-mentioned terminals for selecting one of said lines for connection to said detecting means.

15. A telephone answering-service system in accordance with claim 14 wherein said detecting means comprises a relay circuit for detecting ringing signals applied to said selected line upon the receipt of a call, and said interconnecting means comprises relay means actviated by said relay detecting circuit for interconnecting said selected line and said transfer means to extend the ringing signal over said associated trunk to said bureau.

16. A telephone answering-service system in accordance with claim 15 wherein said one trunk circuit further comprises supervisory means connected to said associated trunk for detecting when the received call is answered at said bureau, and means controlled by said supervisory means at the end of said call for deactivating said relay interconnecting means to disconnect said selected line from said associated trunk.

17. A telephone answering-service system in accordance with claim 16 wherein said common control means further comprises a release circuit activated by release pulses received from said bureau for controlling said crossbar switch control means to effect the release of connections between said selected group of lines and said one trunk circuit.

18. A telephone answering-service system in accordance with claim 17 wherein said release circuit comprises a stepping switch having a terminal bank including a terminal connected to said transfer means, another terminal bank having a terminal connected to said one trunk circuit for receiving a marking potential, a pair of wipers each cooperating with one of said last-mentioned banks, a step magnet responsive to received release pulses for stepping said pair of wipers from terminal to terminal of said cooperating banks and means for applying a received marking potential via terminals of said last-mentioned banks and said pair of wipers to deactivate said transfer means; and wherein said transfer means comprises apparatus for releasing said operated hold magnet to disconnect said one trunk circuit from said selected group of lines.

19. A telephone answering-service system in accordance with claim 18 wherein said one trunk circuit further comprises means connected to the associated trunk via said transfer means upon the deactivation of relay interconnecting means for repeating release pulses received from said bureau, means activated by said last-mentioned repeating means for applying repeated release pulses to said step magnet and means controlled by said last-mentioned repeating means for supplying a marking potential via terminals of said stepping switch, said pair of wipers to deactivate said transfer means.

No references cited.

ROBERT H. ROSE, *Primary Examiner.*

WILLIAM C. COOPER, *Examiner.*